May 26, 1964 N. ALI-OGLU 3,134,308
CARTON ASSEMBLING MACHINE
Filed Aug. 6, 1962 8 Sheets-Sheet 8

United States Patent Office 3,134,308
Patented May 26, 1964

3,134,308
CARTON ASSEMBLING MACHINE
Nesi Ali-Oglu, East Walpole, Mass., assignor to Bird & Son, inc., East Walpole, Mass., a corporation of Massachusetts
Filed Aug. 6, 1962, Ser. No. 215,066
9 Claims. (Cl. 93—37)

The present invention relates to improvements in the manufacture of cartons and similar articles from hard board which may, for example, be corrugated cardboard or a similar material, and is herein disclosed in a preferred form as embodied in a machine for assembling and fastening together egg crates.

The illustrated apparatus is particularly, but by no means exclusively, adapted for use in the manufacture of collapsible egg crates made up of cardboard sections which include a preformed carton body having side and end panels, and top side and end flaps arranged for closing the top of the crate. Other elements of the crate include a bottom liner consisting of a bottom panel adapted to overlie and to be attached to the bottom side tabs and further having upwardly bent end portions which are attached to and reinforce the ends of the crate. There is also provided a vertically disposed partitioning insert which is attached at each end to the side walls of the crate.

In the operation of the machine herein described, the carton body is located on a conveyor in a first or starting position in which the carton body is opened out and the top flaps and bottom side flaps are guided to positions in which they are held through the several adhesive applying and assembling operations. The carton body is advanced in a stepped movement on the conveyor to a second adhesive applying station in which two vertical strips of adhesive are applied to the inner faces of the carton body side panels. A further stepped advance of the conveyor moves the carton body to a carton assembly station at which the carton body is located with relation to the ram member of a carton assembling and fastening press.

At the same time that these operations are being carried on, a bottom liner consisting of an oblong sheet of cardboard is drawn from beneath a stack of said liners on a separate conveyor, is passed through an adhesive applying device adapted for applying adhesive in two strips along each edge of the bottom surface liner, and is delivered into the hands of an operator stationed adjacent the carton assembling and fastening press.

The assembly operation consists in the positioning of a bottom liner to which adhesive has been applied and a partitioning insert with relation to the ram member of the press, and the operation of the press. In this operation, the ram member carrying the bottom liner and partitioning insert downwardly into the carton body positioned beneath the ram, the two ends of the partitioning insert are bent at right angles and are then pressed firmly against the sides of the crate, the bottom liner is pressed firmly against the bottom side tabs of the carton body, and the upturned ends of the bottom liner are at the same time pressed against the two end panels of the frame.

The press by means of which the several parts of the carton are assembled and pressed into a completely assembled and fastened egg crate comprises a bottom support or base for the opened out carton body which may be a portion of the guideway and conveyor assembly of the machine, a vertically movable ram member which is shaped to fit within the carton body, a pair of end press members pivotally mounted on the ram member, turners operative during the downward movement of the ram member to bend the ends of the partitioning insert to their right angle position, and a pair of press members which act laterally to press the adhesive coated sides of the carton body and the inserts between the ram member and said laterally movable press member.

A leading device is provided for locating the bottom liner and partitioning insert with relation to the ram member which comprises a support having parallel ribs to receive the coated bottom liner in a loading area immediately in front of the press and a loading table adjacent said support and adapted to be moved directly beneath the ram member of the press. Guide surfaces are provided on the table and adjacent thereto for the assistance of the operator to position the bottom liner on the table with the end portions folded to an upright position and with the partitioning insert in place. A rearward movement of the table and return causes the assembled bottom liner and partitioning insert to be moved beneath the ram member, so that the upturned ends of the bottom liner are positioned between the end press members and the ram member and the insert enters a transverse slot formed in the ram member.

It is a principal object of the invention is provide an apparatus for the manufacture of cartons of the general type here described which will provide means for the rapid and efficient assembly and securing together of the several parts with an adhesive to form a sturdy and useful container.

It is a further object of the invention to provide a novel carton suitable for use as a collapsible egg crate and a method of assembling and securing into a finished product the assembled section of the carton.

The several features of applicant's improvements in the manufacture of cartons including a machine for producing cartons in accordance therewith will be readily understood by one skilled in the art from the following description taken in connection with the accompanying drawings in which.

Figures 12, 13, 14:
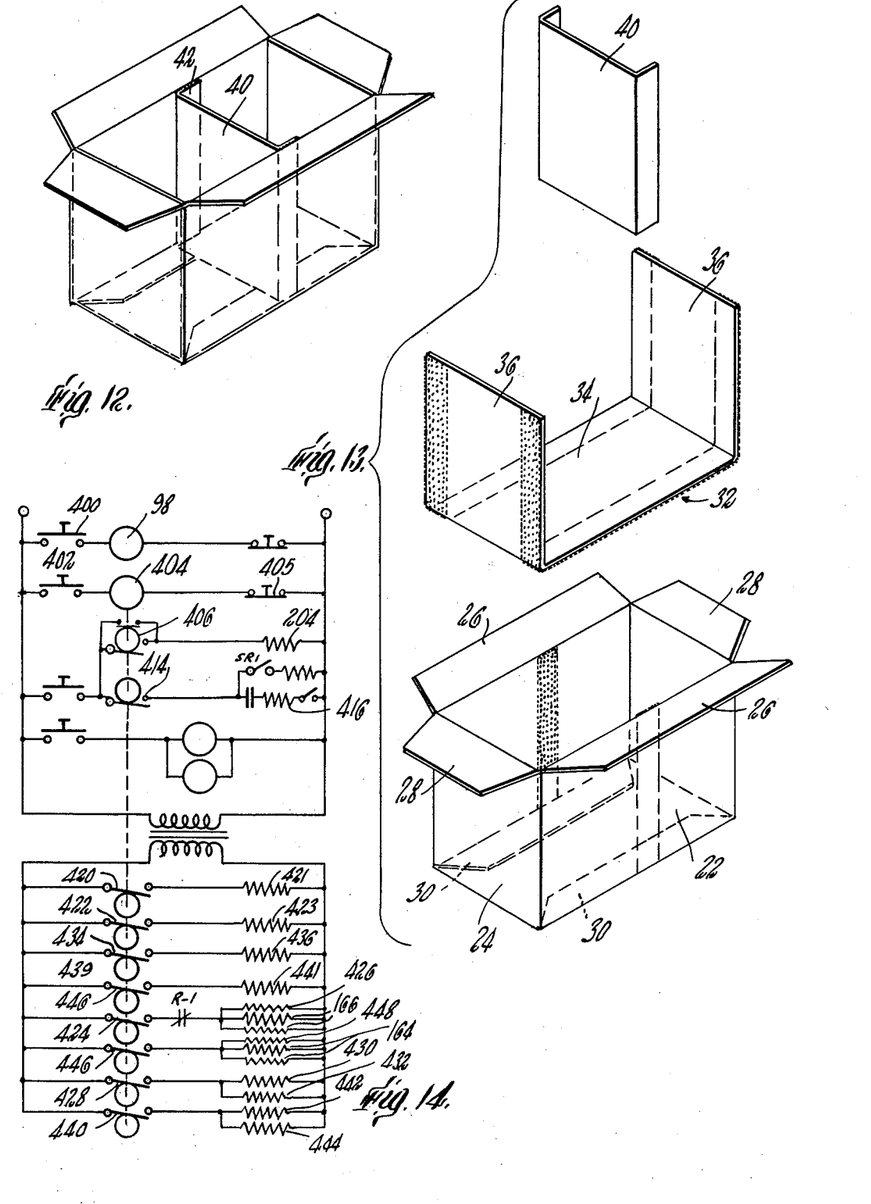
FIG. 12 is a perspective view of an egg crate manufactured in accordance with the invention.
FIG. 13 is an exploded view of the egg crate shown in FIG. 12 illustrating the carton body, bottom liner and partitioning insert in separated position.
FIG. 14 is an electrical diagram illustrating the several electrical operating connections of the apparatus.

The apparatus herein disclosed is particularly adapted for the manufacture of the egg crate illustrated in FIGS. 12 and 13 of the drawings. The egg crate comprises three separate cardboard sections, the first being a preformed carton body 20 having side panels 22 and end panels 24 attached together with side top flaps 26 and end flaps 28 and relatively narrow side bottom tabs 30. The carton body may be made of two pieces of cardboard each comprising a side panel 22 and an end panel 24, the two portions being overlapped and secured together by stapling to form the enclosure. The egg crate is formed also with a bottom liner 32 consisting of an oblong piece of cardboard which is creased to provide a bottom panel corresponding exactly with the inside dimensions of the bottom of the crate and two upwardly turned end portions 36. The crate is divided into two sections by means of a vertically disposed partitioning insert 40 which extends across the crate and is provided at each end with two bent over portions 42 which are attached respectively to the two side panels 22 of the crate. In the preferred form of the invention shown, provision is made for applying an adhesive to portions of the carton body and to the bottom liner, the parts being thereafter assembled and subjected to a substantially pressure to cause the several sections of the carton to be securely held together by the adhesive. The method and apparatus hereinafter described are particularly adapted for the assembly and securing together of a carton in which the fastening medium is an adhesive adapted to be firmly set when the parts are brought together with the application of pressure.

Figure 1:
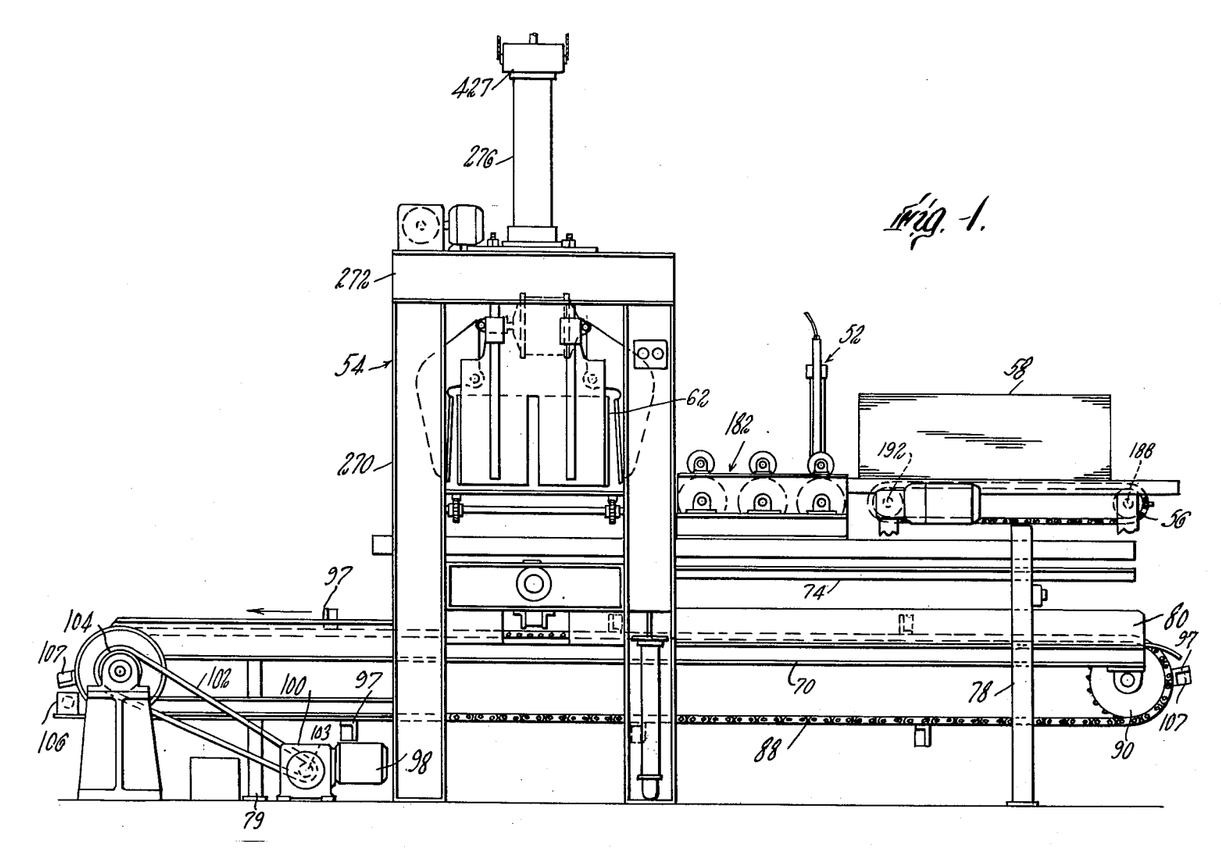
FIG. 1 is a view in side elevation of an apparatus for assembling and for pressure adhering together the component parts of the carton adapted for use as an egg crate.

The machine illustrated for assembling and fastening cartons of the general type shown comprises a main conveyor 50 having a first positioning or locating station at which the operator positions a carton body on the conveyor, a second station at which the carton body is presented to an applicator device for applying a strip of wet adhesive to each inner face of the side walls of the carton body, a third carton assembling and fastening station at which is located a press 54 for assembling together and pressing the assembled sections of the carton into a finished product, and finally a fourth station at which the finished carton or egg crate is discharged from the machine. A second conveyor 56 operated in timed relation to the main conveyor 50 is adapted for moving a bottom liner blank from a pile 58 of such blanks, and advancing said blank through an applicator 60 by means of which two strips of wet adhesive are applied to the edge portions of the underside of said bottom insert. The press 54 is provided with a ram member 62 which normally occupies a raised position as shown in FIG. 1 and which moves downwardly into a carton box frame located by the conveyor 50 in operating position beneath the ram member. As hereinafter more fully set forth it may be noted that the bottom liner fed by the second conveyor 56 is assembled with an insert, by the operator, in a loading device which then acts automatically to locate these sections with relation to the ram member 62 in the press. The press is then caused to move through a single cycle of operations in which the ram member moves downwardly into a carton body positioned therebeneath by the operation of the conveyor 50, and the several sections of the adhesive coated carton are pressed into a finished product.

The conveyor 50 comprises a rectangular guideway (see FIG. 3) having two bottom angle iron guide rails 70, 72 with side surfaces and inwardly projecting bottom surfaces to receive the carton body, and two top angle iron guide rails 74, 76 having side faces and outwardly facing top faces to receive and support the top side flaps of the box frame. The guide rails 70, 72 and 74, 76 are supported at the right hand end in a frame 78 (see FIG. 1), by frame members of the press 54, and in part by an additional frame 79 toward the left hand end of the conveyor. The conveyor is further provided iwth two side plates 80 which extend from the right hand end of the conveyor to the press 54. The conveyor is provided at its right hand or entering end with two bottom flap spreaders 82 which act as a carton body is pushed into the conveyor by the operator to move the bottom flaps 30 upwardly into a right angle position where they rest upon the horizontally disposed bottom surfaces of the angle iron guide rails 70, 72. Overlying the upper rails 74, 76 of the conveyor are two angle iron rails 84, 86 which are attached to the frame 78 and to the frame of the press 54 to engage with and hold the side flaps of the carton body in an outwardly bent right angle position with respect to the side panels of the box frame. This position of the side flaps 26 is maintained during the movement of the carton body through the first, second and third stages of the operation, and until the carton body is moved to its discharge position at the left hand end of the conveyor.

Figure 2:
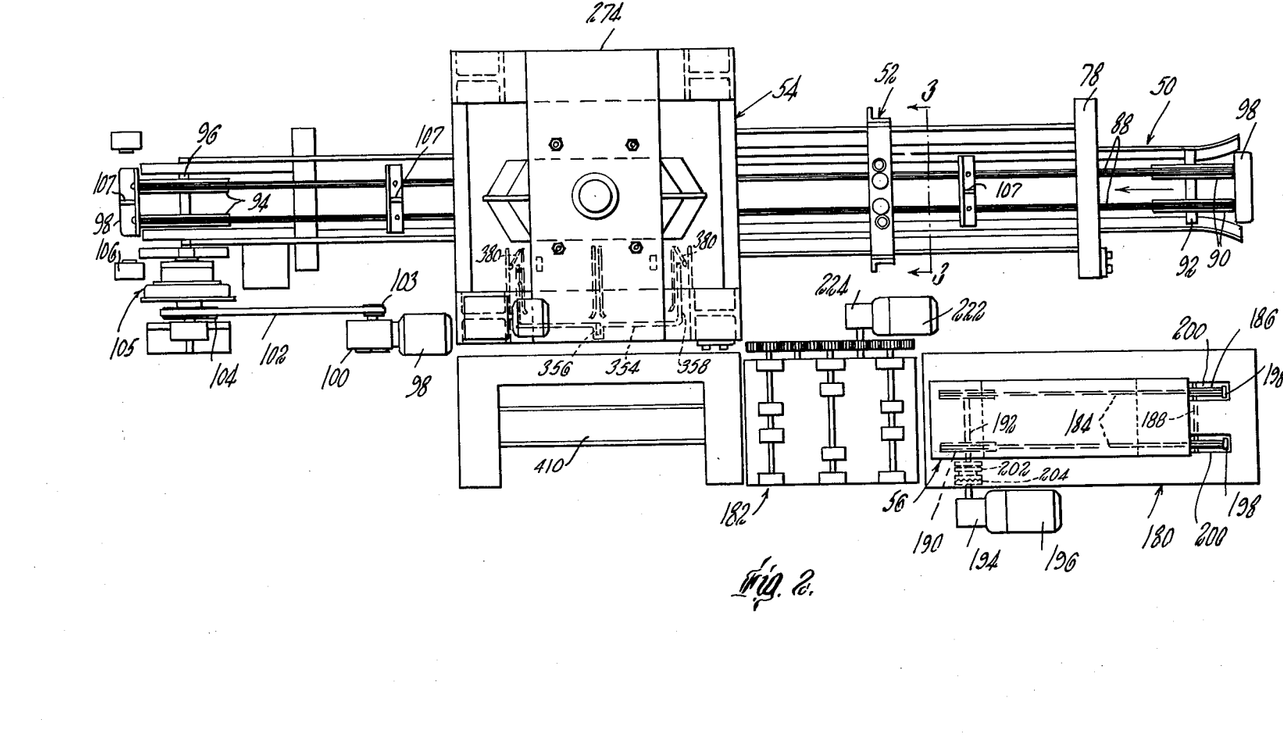
FIG. 2 is a plan view of the apparatus shown in FIG. 1.

The conveyor 50 is provided with two endless chain belts 88 which ride over sprockets 90 mounted on a cross shaft 92 at the right hand end of the conveyor and around sprockets 94 mounted on a cross shaft 96 at the left hand end of the conveyor 50. At intervals along their length, the endless chains 88 have supported thereon angle iron cross bars 97 which act as pushers for the carton bodies successively fed to the conveyor. As best shown in FIGS. 1 and 2 the conveyor belts 88 are driven by a motor 98 which is connected through a reduction gear mechanism 100 and a belt 102 and pulleys 103 and 104 mounted respectively on an output shaft from the reduction gearing and on the shaft 96. An electrically operated clutch and brake mechanism generally indicated at 105 (see FIG. 2) operates when energized to effect successive stepped advances of the belts 88 and pushers 97. Each said advance is arrested by the operation of a photoelectric cell 106, the beam of which is interrupted by a small plate or tab 107 set at right angles upon each pusher 97 in turn. The pushers 97 are so located on the belt to cause each successively loaded carton body to be advanced from one station to the next with each stepped advance of the conveyor belt.

The second station to which the carton body is moved by an advance of the carrier belts 88 is the pressure adhesive applying station at which is located the pressure adhesive applicator 52.

Figure 3:
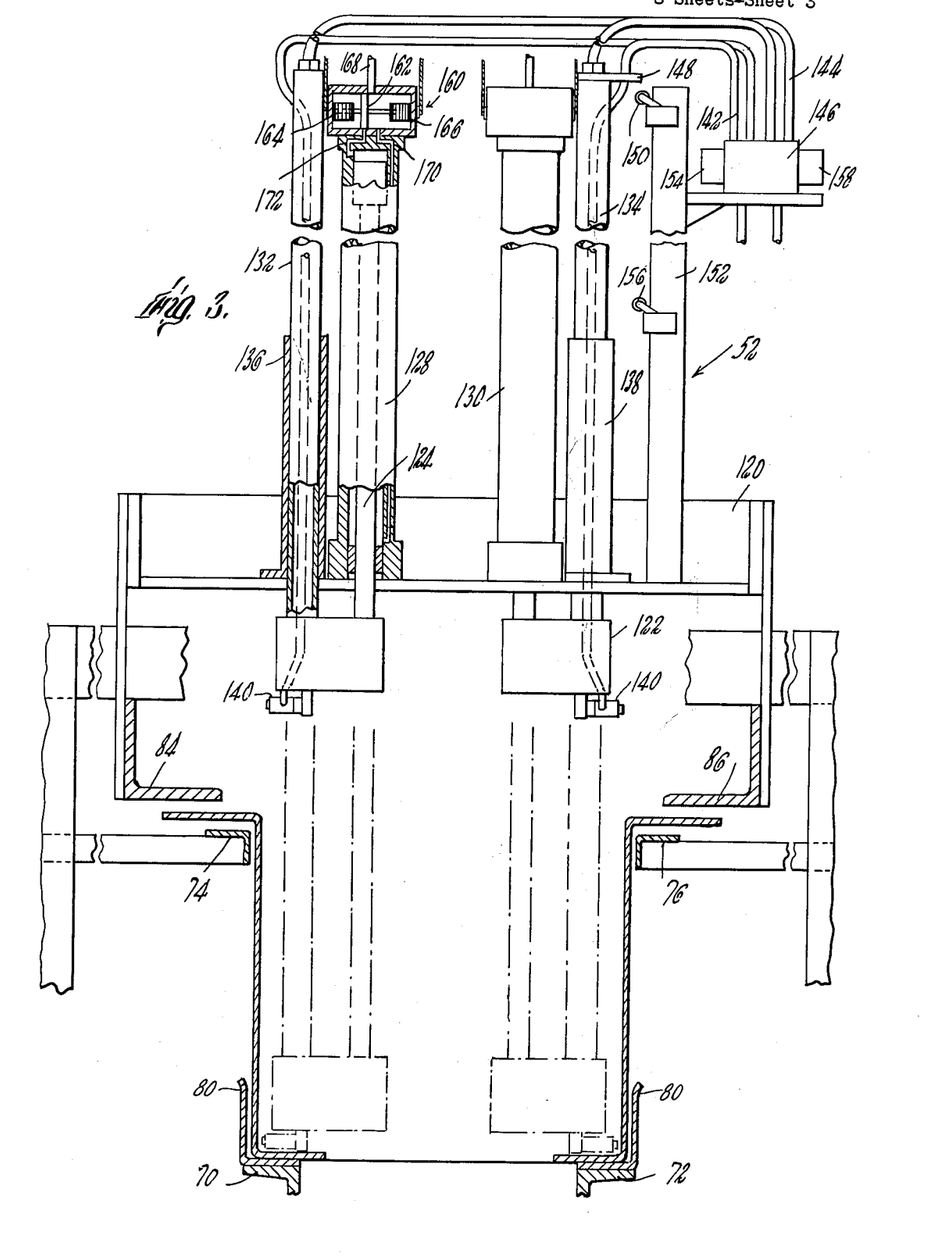
FIG. 3 is a view in elevation taken on a line 3—3 of FIG. 2 illustrating particularly the mechanism for applying adhesive to the inner faces of the side panels of the carton body.

The applicator 52 for applying an adhesive to the inner face of the box frame side panels comprises a cross frame 120 on which is carried a vertically movable carriage 122 secured to the lower ends of two pistons 124, 126 associated with air cylinders 128, 130 supported on the cross frame 120. As best shown in FIG. 3 the cross frame 120 is mounted on the two longitudinally extending angle iron rails 84, 86 in such position that the downward movement of the carriage 122 will cause it to move accurately within the carton body located at the second or applicator stage of the conveyor 50. The carriage 122 also carries two adhesive conveying tubes 132, 134 which are attached at their lower ends to the carriage 122 and are slidably guided in sleeve members 136, 138 mounted on the cross frame 120. The adhesive is supplied to the tubes 132, 134 through flexible pipes from a source not specifically shown. For applying the adhesive there is provided at each end of the carriage 122 an applicator spray nozzle 140. Air under pressure is applied to the nozzles 140 through flexible lines 142. The adhesive supply tubes indicated at 144 and air lines 142 are connected with a solenoid controlled shut off valve 146 shown in FIG. 3. The valve is shifted to open position during the downward movement of the carriage 122 by the engagement of a contact arm 148 secured to the upper end of the tube 134 while moving downwardly with a microswitch 150 on a vertical post 152, which energized solenoid 154 connected with said valve 146, and is subsequently shifted to the off position by the engagement of said downwardly moving contact arm 148 with a second microswitch 156 which energizes a shut off solenoid 158 associated with said valve. The microswitches are constructed and arranged to be operated by said contact arm only when moving in the downward direction.

It will be understood that the invention is not limited to the specific form of applicator shown and that other well known forms of applicators as, for example, a brush type applicator may be used in place of spray nozzles 140.

The operation of the pressure adhesive applying device is controlled by means of two electrically operated reversing valves 160 located at the top of the respective air cylinders 128, 130. Since these valves are identical and operate as a unit only one of said valves is specifically illustrated. In the following description it will be assumed that the second valve associated with the air cylinder 130 is identical with and operates simultaneously with the valve 160.

The valve 160 comprises a valve body housing a longitudinally movable piston 162 which is connected at opposite ends to solenoids 164, 166. When the solenoid 166 is energized, air is admitted from an air inlet line 168 to the outlet 170 which connects with the bottom end of the cylinder 128 and thus maintains the support cylinders and the yoke 122 in a raised inoperative position. When the solenoid 164 alternatively is energized the piston 162 is moved to the left so that air is admitted from the inlet pipe 168 to the outlet 172 connecting with the upper end of the cylinder which causes the cylinder to be moved downwardly. As hereinafter more fully set forth the cylinders are operated simultaneously to move the yoke 122 at first downwardly and then upwardly while at the same time the adhesive shut off valve 146 is moved first to open position so that a strip of adhesive is applied to the side panel walls during the downward movement of the carriage 122, and is thereafter moved to its closed position.

The secondary conveyor 56 and associated device for applying adhesive thereto is best shown in FIGS. 1, 2, 9, 10 and 11 of the drawings in which there is shown a table 180 for supporting the pile 58 of bottom liners which are individually designated in FIGS. 12 and 13 by the reference character 32. Individual bottom liners are removed from the bottom of the pile and fed to the adjacent adhesive applicator designated at 182 by means of the conveyor 56 which as shown comprises a pair of endless chains 184 which pass around sprockets 186 on a shaft 188 at the right hand end of the conveyor and around sprockets 190 mounted on a drive shaft 192 at the left hand end of the conveyor. The shaft 192 is connected to a gear box 194 and electric motor 196 at the near side of the conveyor. Pairs of lugs 198 mounted in parallel relation on the two belts 184 are arranged to project upwardly through slots 200 formed in the surface of the table 180 and advance behind and advance the bottom blank from beneath the pile. The shaft 192 is connected with the motor 196 through a one revolution clutch 202 which is operated intermittently by means of a solenoid 204 to advance bottom liners successively into the adhesive applicator 182.

The adhesive applicator 182 comprises a frame in which are mounted three cross shafts 210, 212 and 214 below the level of the bottom insert which is passed through the applicator, and three additional cross shafts 216, 218 and 220 mounted above the level of the advancing bottom insert 34. The three shafts 210, 212 and 214 are synchronously driven from an electric motor 222 and reduction gear box 224 (see FIG. 2). The output shaft 226 from the gear box 224 carries a pinion 228 which is interposed between and meshes with each of two driven gears 230, 232 carried respectively on shafts 210 and 212. The gear 232 meshes with an idler gear 234 which in turn meshes with a gear 236 on a shaft 214 which is thus driven in synchronism with the shafts 210 and 212. Each of the upper shafts 216, 218, 220 are simultaneously driven in synchronism with the lower shafts by means of gear connections which comprise a gear 238 on shaft 216 which meshes with the gear 230, a gear 240 on shaft 218 which meshes with gear 232 and a gear 242 on shaft 220 which meshes with gear 236 on shaft 214. With the arrangement shown each of the two pairs of shafts 210, 216 and 214, 220 are provided with driving rollers mounted respectively on these shafts which operate to carry the insert fed to the applicator device forward. The feed rollers referred to comprise two lower rollers 246 on shaft 210 which cooperate with upper rollers 248 on shaft 216, and a pair of lower rollers 250 on shaft 214 which cooperate with a pair of upper rollers 252 on the upper shaft 220. It will be noted that the feed rollers referred to are spaced relatively close together so that they engage with the middle portion only of the advancing bottom insert 34. Adhesive is applied in the form of two strips along the undersurface edge portions of the bottom insert 34 by means of two adhesive applying rollers 256 on shaft 212, the lower portions of said rollers being immersed in adhesive contained in a reservoir 258. The bottom liner is pressed downwardly against the rollers 256 to insure the transfer of a substantial coating of adhesive to the bottom liner by means of two cooperating press rollers 260 mounted on the cooperating upper shaft 218. During operation of the machine a bottom liner 34 is slid from under the pile 56 by the operation of the conveyor 58 and is engaged between the feed rollers 246, 248 of the adhesive applicator device 182, and is thence passed through the applicator device receiving a coating of adhesive as above described. The coated bottom liner is taken by the operator as it emerges from the applicator device 182 and is assembled with the other sections of the carton in the carton assembling and forming press hereinafter to be described.

Figure 4:
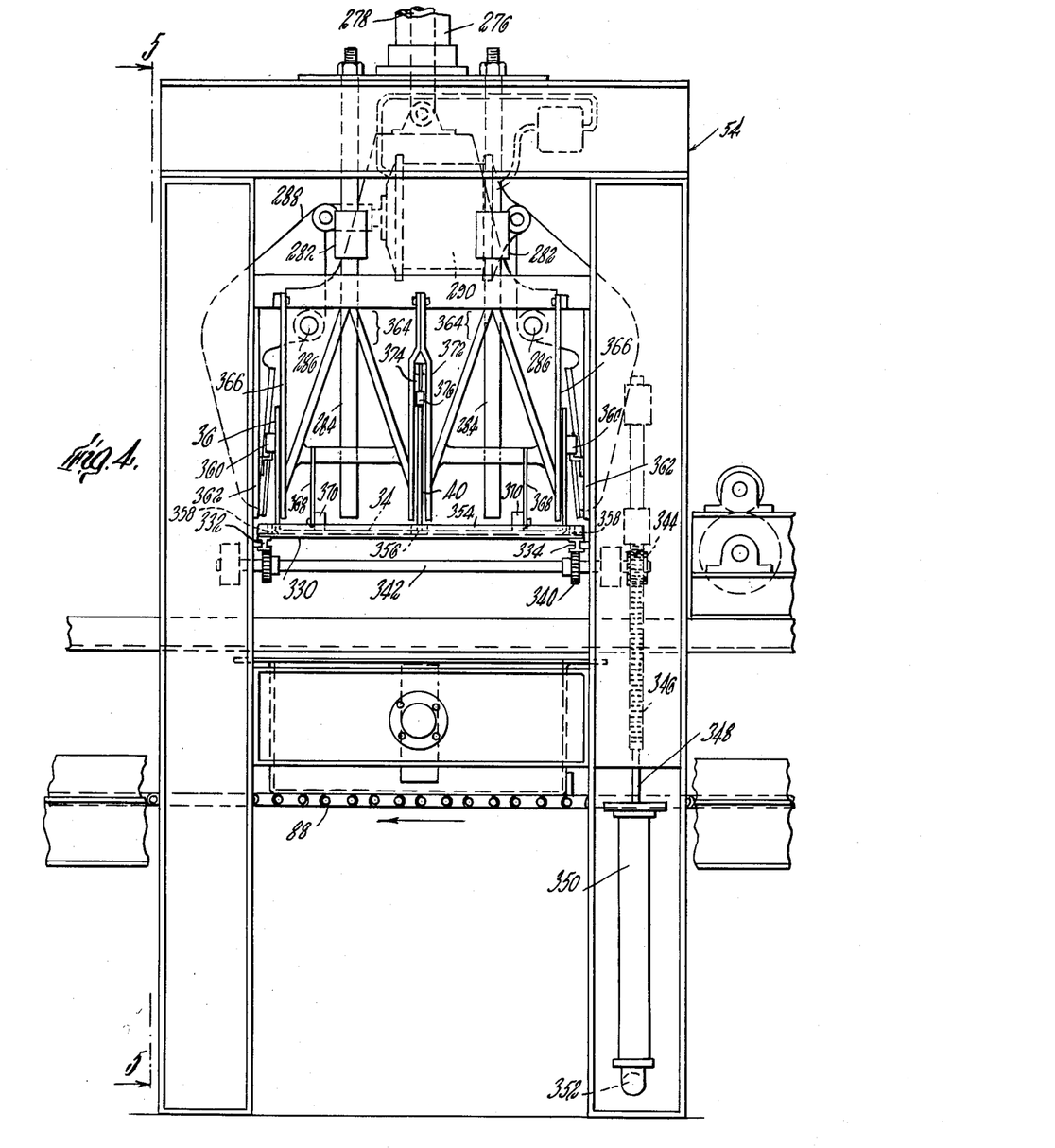
FIG. 4 is an enlarged detail view of the press shown in side elevation illustrating particularly the press for assembling and adhering together the several sections of the carton.
Figure 5:
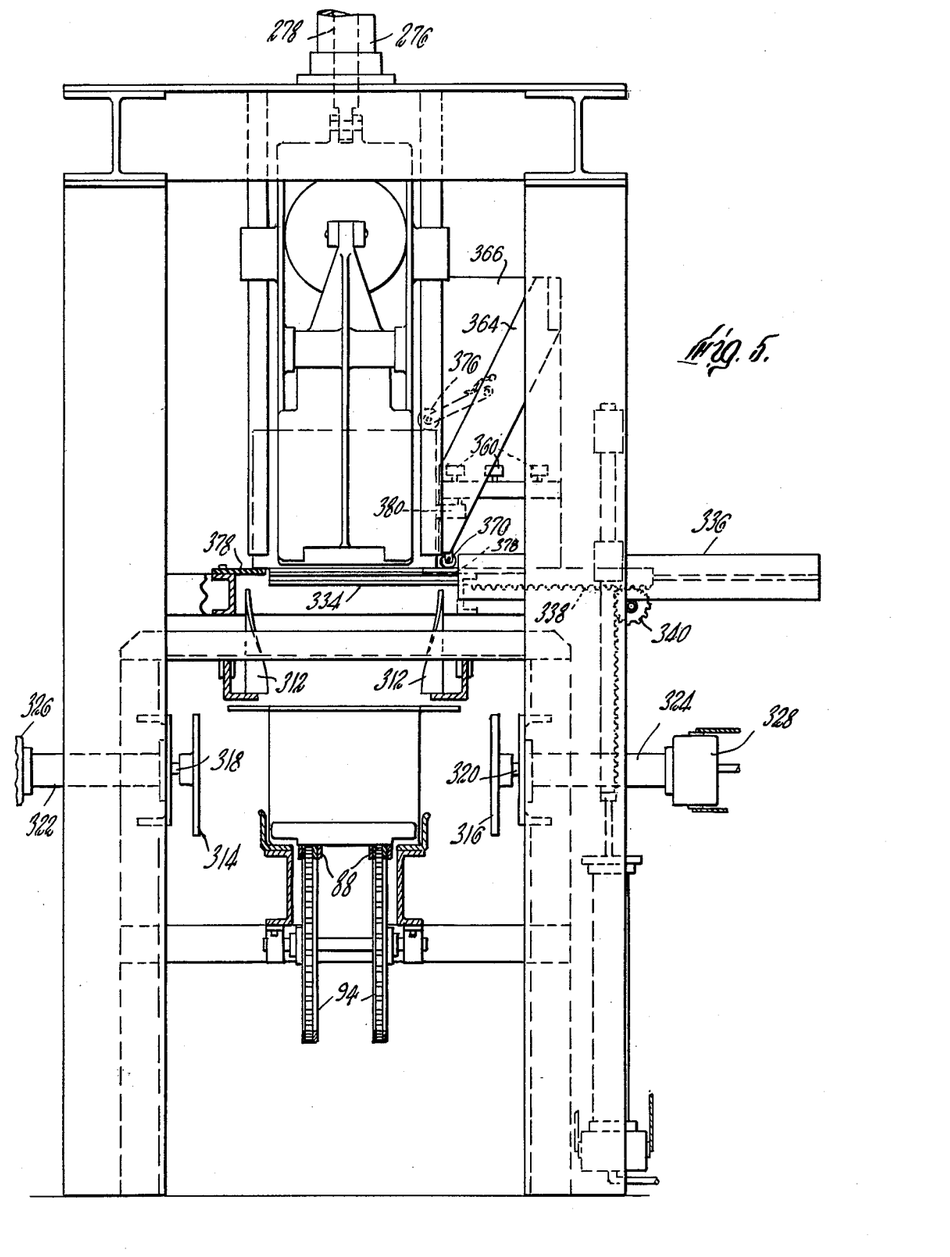
FIG. 5 is an elevation looking from right of FIG. 4 as indicated by line 5—5 on FIG. 4.

The box forming press 54 comprises a frame having four vertical posts 270, cross pieces 272 and a top plate 274, see FIG. 2, on which is mounted an air cylinder 276 having a piston 278, see FIGS. 3 and 4, connected at its lower end to the ram member 62 vertically movable from the raised position shown, for example, in FIGS. 4 and 5 to a lowered position in which the ram member is projected within a carton body located in assembly position. The ram member is guided during its upward and downward movements by means of four guide posts 284 secured to the top plate 274 of the press to be engaged by sleeve members 282 attached to the ram member. The ram member 62 has an oblong shape which is slightly smaller than and is adapted to fit accurately within the carton body located beneath the ram member in the press. The ram member 62 is formed with two upwardly projecting lugs to receive two transverse pivots 286 on which are pivotally mounted a pair of end press members 288 having upward extensions which are connected by an air cylinder 290. The air cylinder is pivotally attached at one end at 292 to one of the end press members, the cylinder piston 294 being attached at 296 to the other of said end press members. As will readily be evident from an inspection of FIGS. 4, 5 and 6, each of the end press members 288 is provided with an oblong end press surface, the lower portion of which is stepped inwardly toward the engaging press member 288. This stepped arrangement permits the lower portion of the press surface of each end press member 288 to engage the lower portion of the end panel of the carton body while the stepped back upper portion thereof engages with equal pressure against the folded over end flaps of the carton body. There are shown in FIG. 4 the end press members 288 normally held in the retracted or separated position of FIG. 4 in which it is possible to position a bottom liner around the ram member with the end portions thereof bent upwardly to extend between the end portions of the ram member 62 and the relatively retracted press member 288.

Figure 6:
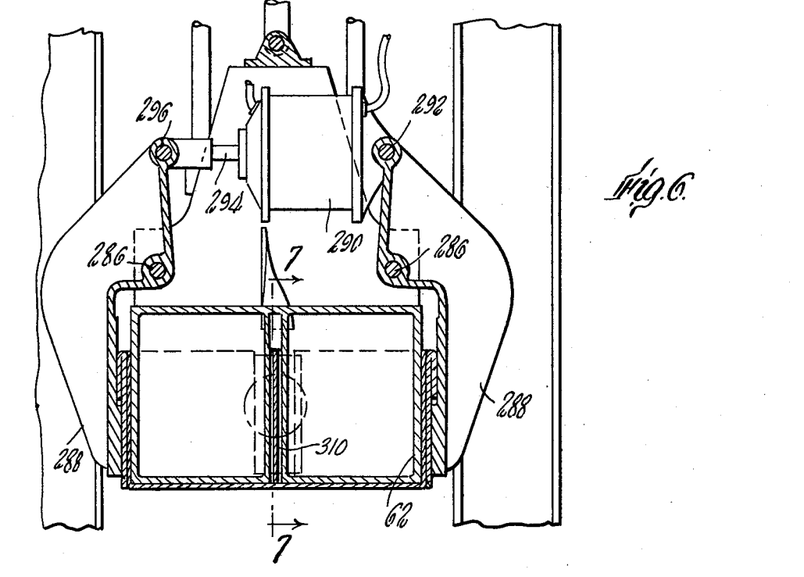
FIG. 6 is a detail sectional view illustrating particularly the mechanism for pressing together the end panels and upwardly turned end portions of the bottom liner of the crate as shown in FIG. 4 but with the end clamps in clamping position.
Figure 8:
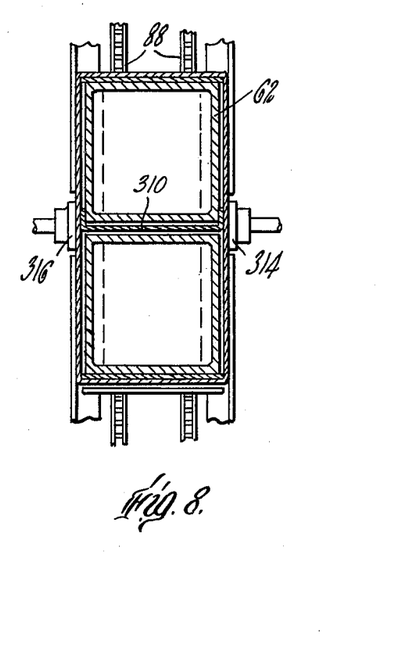
FIG. 8 is a sectional plan view taken on a line 8—8 of FIG. 7.
Figures 9, 10, 11:
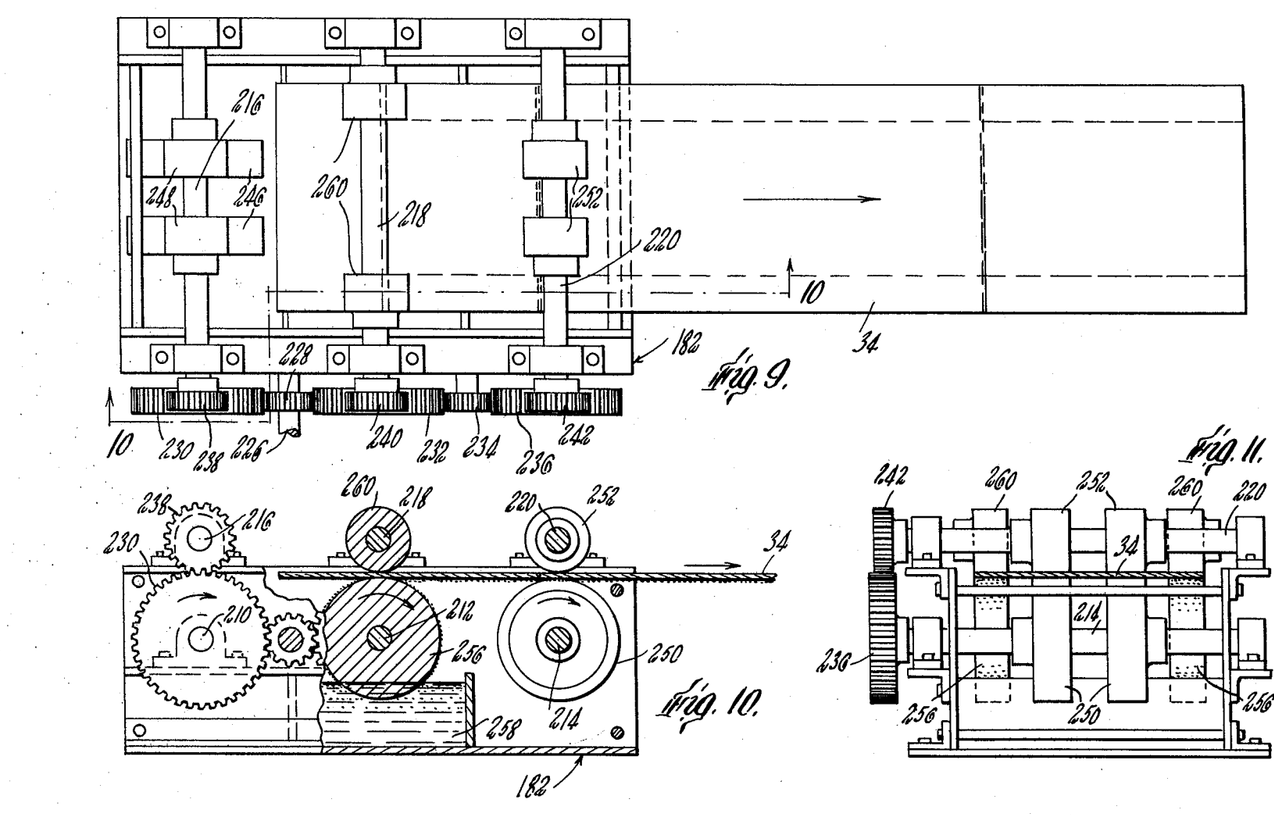
FIG. 9 is a plan view on a large scale of the auxiliary conveyor and the device for applying adhesive to the underside of the bottom liner.
FIG. 10 is a view in side elevation taken on a line 10—10 of FIG. 9 illustrating particularly the manner in which adhesive is applied to the underside of the bottom liner.
FIG. 11 is an end view of the mechanism shown particularly in FIG. 10.

The ram member 62 has formed in the bottom face thereof a vertical transverse slot 310 (see FIGS. 6 and 8)

to receive the partitioning insert 40 which is thus assembled with the bottom liner 34 on the ram member preparatory to the operation of the press. The two end portions of the partitioning insert 40 are bent at right angles so that they will be fitted against the adhesive coated inside faces of the side panels 22 of the carton body 20 during the downward movement of the ram member 280. This operation is effected by means of two turners 312 mounted on the side rails 84 which extend across the front and rear sides of the press (see FIG. 5).

Figure 7:
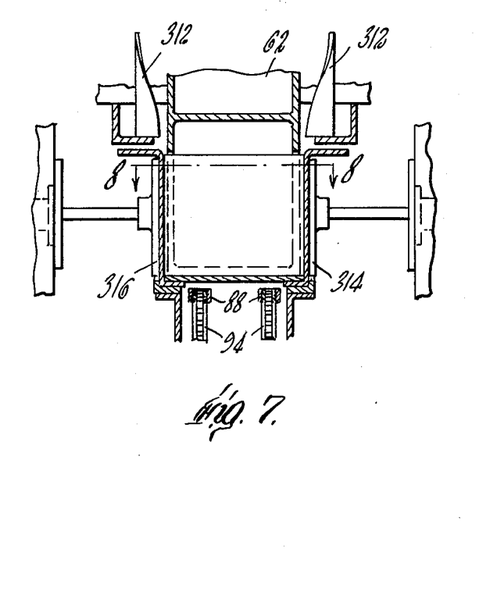
FIG. 7 is a sectional view in elevation taken on a line 7—7 of FIG. 6.

The ram member 62 is moved downwardly into the carton body 20 until the bottom liner 34 is pressed firmly against the bottom tabs 30 of the carton body supported on the horizontal faces of the angle iron bars 70, 72 above referred to as shown in FIG. 7. At the same time two side press members 314, 316 consisting of oblong press plates carried on pistons 318, 320 associated with air cylinders 322, 324 (FIGS. 5 and 7) mounted on side rails 325 forming part of the press frame are advanced to engage and press the adhesive coated side wall 22 of the carton body and the bent over edges of the partitioning insert 40 between the respective press members 314, 316 and the sides of the ram member 62. The operation of the air cylinders 322, 324 is controlled by solenoid operated valves 326, 328. Since these valves are essentially duplicates of the solenoid controlled valve 160, above described, it is believed unnecessary to describe or illustrate each of these valves in further detail.

For the assistance of the operator in assembling the bottom liner 34 and partitioning insert 40 with relation to the ram member 288 in the press, a loading device including a table 330 is provided on which the bottom liner and partitioning insert are assembled by the operator in a position immediately in front of the ram member 62. The table with the bottom liner and partitioning insert mounted thereon are then moved rearwardly beneath the raised ram member 62. The table is again withdrawn before the ram member starts its downward movement. The table 330 comprises a rectangular sheet which is mounted on two rails 332, 334 which extend cross-wise of the press and are mounted at the rear side of the press in two giudeways 336 (see FIG. 5). Each of rails 332, 334 is provided along its underside with a rack 338 engaged by a pinion 340 on a pinion shaft 342. The second pinion 344 on shaft 342 engages with a rack 346 attached to a vertically movable piston 348 of an air cylinder 350 disposed vertically in the base of the press frame. A solenoid operated valve 352 attached to the end of the air cylinder 350 acts to control the upward and downward movement of the piston 348 and through the connections above described acts to advance and thereafter to retract the table. Inasmuch as the valve 352 is similar to the valve 160 previously described no particular illustration and description of this valve is relieved necessary.

For supporting in the desired position and for guiding the assembled bottom liner and partitioning insert onto the press, the table 330 is provided with a rail 354 within which the bottom liner is fitted. A central portion of said rail is shaped to form a slot 356 to receive one end of the vertically positioned partitioning insert. The upwardly folded ends of the bottom liner are externally positioned by rearward extension 358 on the rail 354 and by rows of rollers 360 mounted on vertical axes on rails 362 which extend rearwardly toward the ram member beyond each end thereof. A stationary loading frame 364 mounted above the table 330 is formed with side plates 366 which engage and support the upwardly folded ends of the bottom liner from the inside, and with two adjustably secured downwardly extending arms 368 having attached thereto rollers 370 which bear against and hold the control portion of the bottom liner firmly down against the table. There is also provided a centrally located casing 372 having formed therein a vertical rearwardly extending slot 374 in which the partitioning insert is supported and guided when positioned on the table with the rear end thereof in the slot 356. A spring pressed roller 376 mounted on the rear edge of said casing is arranged to press downwardly against the upper edge of the partitioning insert as it is pushed into the slot. When the table is now moved rearwardly beneath ram member 62 the bottom liner and partitioning insert held by the rail 354 and slot 356 are moved therewith so that the horizontally positioned middle portion of the bottom liner slips beneath the under face of the ram member 62, the upwardly folded ends slide between the end faces of the ram member and the retracted end press members 288, and the vertically disposed partitioning insert moves into the vertical slot 310 extending across the under face of the ram member 62. The table 330 is then returned forwardly from beneath the ram member to its original loading position.

The bottom liner and partitioning insert are now supported in their assembled position with relation to the ram member 62 by means of four rubber tabs 378, two of which project inwardly from side frame members of the press beneath the bottom insert. Two spring pressed latch members 380 mounted on the press frame at each end of the ram member engage against the edges of the upwardly folded end portions of the bottom insert to lock the cardboard sections in assembled position as the table is withdrawn.

The operation of the machine, in which the several sections of the carton are assembled with adhesive applied thereto and are thereafter pressed into a finished carton, will be briefly described as follows.

It is assumed that a carton body has been positioned at station 1 of the conveyor 50, in which the bottom tabs 30 are moved to a right angle position so that they rest on the bottom guide rails 72 and the top side flaps 26 are moved to an outwardly extending right angle position in which they are engaged between the top guide rails 76 of the guideway and the overlying guide rails 86 as shown in FIG. 3, and has been advanced to the adhesive applying station 2. The carriage 122 of the adhesive applying device 52 at station 2 and the ram member 62 of the press 54 are in their fully raised position, and with the end press members 288 retracted. The table 330 is in its advanced bottom liner receiving position in front of the ram member 62. The conveyor motor controlled by starting switch 400 is running. The adhesive device operating motor 222 and the secondary conveyor motor 196 are running.

The operator is now in a position to start an operating cycle of the machine. A starting button 402 is pressed starting a cam switch motor 404 illustrated diagrammatically in the electrical diagram FIG. 12. The machine will now operate continuously until the operator presses stop button 405 to disconnect the cam switch motor 404.

Cam switch 406 operates to energize the solenoid 204 which controls the one revolution clutch 202 to cause the auxiliary conveyor 56 to engage and advance a bottom liner from the pile into the adhesive applicator 182. Adhesive is applied to the bottom liner in two strips along the under side thereof and the bottom liner is then discharged onto a ribbed support 410 adjacent the table. The operator immediately folds the ends of the bottom liner upwardly and assembles the same and a partitioning insert on the table with relation to the loading frame 364.

Cam switch 414 is energized to close a relay 416 through which the clutch and brake mechanism 105 associated with the main conveyor motor 98 is rendered operative to advance the main conveyor 50 through one step so that the carton body at station 2 freshly coated with adhesive is advanced into the press 54 at station 3. This advance is arrested by means of the electric eye 106 and suitable connections in a control box 418 for the conveyor drive. Inasmuch as the step clutch-brake drive mechanism for the conveyor 50 forms specifically no part of the present invention, no further description or illustration is believed necessary.

After the advancing movement of the conveyor is completed the press is started in operation to effect the final assembly and pressing of the carton sections into the fixed product. The cam switch 420 closes energizing solenoid 421 associated with solenoid actuated valve 352 to move the table 330 and assembled bottom liner and partitioning insert beneath the ram member 62. Immediately thereafter, cam switch 422 operates to energize solenoid 423 reversing the valve 352 and causing the table to be returned to its initial position.

Cam actuated switch 424 is closed energizing solenoid 426 associated with the solenoid operating valve 427 for the ram member actuating cylinder 276. The ram member 62 now moves downwardly. The ends of the partitioning insert 40 are folded to a right angle position by the turners 312 and are brought into engagement with the adhesive coated faces of the side panels 22 of the carton body. As the ram member reaches its bottom position, the adhesive coated under surface of the bottom liner 34 and the bottom side tabs 30 are firmly pressed between the ram member 62 supporting rail members 74, 76.

Cam switch 428 closes energizing solenoids 430, 432 associated with the solenoid operated valve 326, 328 for the respective side press cylinders 322, 324 so that the side presses 314, 316 move inwardly to engage the side panels 22 of the carton body and the folded edge portions of the partitioning insert 40 between the said side press members and the ram member 62.

At the same time that the side press members are advanced a cam switch 434 is actuated to energize solenoid 436 which controls a valve 438 (FIG. 4) supplying compressed air to cylinder 290 causing the end press member 288 to operate pressing the raised portions of the bottom liner and end panels 36 of the carton body between the end press members and the ram member 62. After an interval in which the adhesive is allowed to set a cam switch 439 operates a solenoid 441 reversing valve 438 allowing the end press members 288 to return to their separated positions shown in FIGS. 1 and 4.

A cam switch 440 is now actuated to energize solenoids 442, 444 associated with the respective solenoid valve 326, 328 to effect the return movement of the side press members 314, 316. A cam switch 446 now closes energizing solenoid 448 to reverse the position of the solenoid actuated valve 427 for the ram member actuating cylinder 276 so that the ram member 62 is returned to its raised position.

At the same time that the ram member 62 of the press is moved downwardly to assemble and press the sections of a carton into a finished product the adhesive applicator at station 2 is rendered operative to apply a strip coating of adhesive to a carton body at said station 2. To this end the operation of cam switch 424 is caused also to energize solenoids 166 associated with the reversing valves for the two air cylinders 128 and 130. During said downward movement of the cylinders and adhesive carrying tubes associated therewith, adhesive is forced out of the spray nozzles as above described.

The operation of cam switch 446 above referred to as initiating the return movement of the ram member 62 acts also to energize solenoids 164 reversing the valves 160 so that the carriage 122 and spray nozzles are returned to their high inoperative position.

In the preferred embodiment of the invention shown, two operators may be employed, one acting to assemble a bottom liner and partitioning insert in the press for each successive press operation and the other operator to position an opened out carton at station 1 following each stepped advance of the conveyor. For the convenience of the operators duplicate start buttons 402 and stop buttons for the switch cam motor are provided at station 1 and at station 3.

The invention having been described what is claimed is:

1. In a machine for the manufacture of cartons from cardboard and similar materials from assembled components including
   a carton body having connected side and end walls and bottom side tabs,
   a bottom liner having upwardly bent end portions,
   and a partitioning insert
   the combination of
   a press having
   a vertically movable ram member shaped to fit within said carton body
   and a vertical slot extending transversely of said ram member to receive said partitioning panel,
   a pair of end press members pivotally mounted on said ram member,
   folding devices on said carton body support operable during downward movement of said ram member within the carton body to bend the outwardly extending edges of said partitioning insert,
   a pair of side press members laterally movable on said frame support for externally engaging and pressing said carton body and folded insert edges,
   said end press members having a separated position to receive the upturned ends of a bottom liner and a press position to press together said end walls of the carton body and said upturned ends of the bottom liner,
   and actuating means for moving the ram member downwardly to press the bottom tabs against the bottom liner and to engage said end press members and side press members to press together the assembled components of said carton.

2. In a machine for the manufacture of cartons from cardboard and similar materials from assembled components including a carton body having side and end panels and bottom side tabs,
   a bottom liner having upwardly bent end portions, and a partitioning insert,
   means for advancing a carton body to successive adhesive applying and press stations,
   a press comprising a ram member having bottom, end and side faces and a transverse vertical positioning insert receiving slot extending upwardly from the bottom face movable within a carton body located at said press station to press an assembled bottom liner and positioning insert against said carton body,
   an adhesive applicator arranged for applying strips of adhesive to the underside of a bottom liner along the edges thereof,
   means at said adhesive applying station for applying strips of adhesive to the inner walls of said side panels,
   a pair of end press members pivotally supported on said ram member acting against the end faces of the ram member,
   a pair of side press members acting against the side faces of said ram member,
   a loading device for assembling a bottom liner and positioning insert with relation to said ram member and
   means for advancing the ram member to engage an adhesive coated bottom liner with said bottom tabs
   means for advancing said end press members to press said end panels against the upwardly folded adhesive coated end portion of said bottom liner,
   and means for advancing said side press member to engage said partitioning insert with the adhesive coated inner faces of said side panels.

3. In a machine for the manufacture of cartons from cardboard and similar materials from assembled components including a carton body having side and end panels and bottom side tabs
   a bottom liner having upwardly bent end portions, and a partitioning insert, the combination of a conveyor for loading and step-advancing carton bodies having a carton body loading station, an adhesive applicator station, a press station, and a carton discharge station, a press comprising a reciprocable ram member formed to press an assembled bottom liner and partitioning insert within a carton body located at said press station, an auxiliary conveyor device including an adhesive applicator for applying strips of adhesive to the under side of a bottom liner adjacent the lengthwise edges thereof and a loading device movable from one side into the path of said ram member and return, and means for assembling an adhesive coated bottom liner and a partitioning insert on said loading device for movement therewith into an assembled position in the path of said ram member.

4. In a machine for the manufacture of cartons from cardboard and similar materials from assembled components including a carton body having connected side and end panels and bottom side tabs, a bottom liner having upwardly bent end portions, and a partitioning insert, the combination of a press having means for supporting a carton body, a reciprocable ram member formed to receive and to press an assembled bottom liner and positioning insert within said carton body, side and end press members movable to press said carton body and component members against said ram member, and a loading device for assembling a bottom liner and positioning insert with relation to said ram member comprising a table movable from one side beneath the ram member, a stationary guiding frame overlying said table for locating said bottom liner and positioning insert on the table for movement beneath the ram member, means for advancing and retracting the table, and means for actuating said ram member and side press members to assemble and press said component elements into a carton.

5. In a machine for the manufacture of cartons from cardboard and similar materials from assembled components, the combination of a press having a ram member formed to receive and to press together an assembly of said components, said ram member being movable between retracted and press positions, a loading device for assembling said components with relation to said press member comprising a table movable from one side beneath the retracted ram member, a stationary guiding frame overlying said table for supporting and guiding components of said carton into an assembled position beneath said ram member, means for advancing said table and components thereon beneath said ram member and thereafter retracting the table, and means for advancing and retracting said ram member.

6. In a machine for the manufacture of cartons from cardboard and similar materials from assembled components including a carton body having connected side and end walls and bottom tabs, a bottom liner having upwardly bent end portions, and a partitioning insert, the combination of the press having a ram member formed to receive and to press a bottom liner having upwardly folded end portions and a transverse partitioning insert within said carton body, a loading device comprising a table having positioning rails, and a stationary guiding frame having surfaces for supporting and guiding said bottom liner including the upwardly folded end portions, and the partitioning insert on the table beneath the ram member, detent members engaging said upwardly folded end portions against return with the table and means for advancing and retracting table and for actuating said press.

7. In a machine for the manufacture of cartons from cardboard and similar materials from assembled components including a carton body having side and end panels and bottom side tabs, a bottom liner having upwardly bent end portions, and a partitioning insert, the combination of means for advancing a carton body to successive adhesive applying and press stations, a conveyor having loading, adhesive applicator, press and discharge stations, spaced from one another a conveyor belt having carton body engaging elements having the same spacing with said stations means for imparting stepped advances to said conveyor belt to advance a carton body on said conveyor belt from one to the next adjacent station, a pair of vertically movable adhesive applicators at said adhesive applicator station for applying vertical strips of adhesive to the inner faces of said side panels, a press comprising a reciprocable ram member having under side and end faces and a transverse partitioning panel positioning slot movable within a carton body at said press station a pair of end press members movable to press said upwardly folded end portions and end panels against the end faces of said ram member a pair of side press members movable to press the ends of said partitioning insert and side panels against the side faces of said ram member, an auxiliary conveyor and bottom insert adhesive applying device associated therewith, a loading device including a table on which an assembled bottom insert and partitioning liner are moved under said ram member, means for advancing said table beneath the ram member and return, a control and mechanism for automatically operating said conveyors in an operating cycle to advance the conveyor belt and carton body theron one step, and to apply adhesive to a bottom liner for assembly with a partitioning insert on said table, to move said ram member and said adhesive applicators downwardly, to operate said end and side presses, and to return each of ram member adhesive applicators and end and side presses to the initial position.

8. A machine for the manufacture of cartons in accordance with claim 7 in which the control mechanism comprises fluid operated cylinders for operating each of said ram member, table, side and end press members and vertically movable adhesive applicators, electric motors and clutch and braking devices for each of said conveyors, a cam switch and connections therefrom for actuating each of said fluid actuated cylinders and clutch and braking devices in accordance with said operating cycle.

9. In a machine for the manufacture of cartons from cardboard and similar materials from assembled components including a carton body having side and end panels top side and end flaps and bottom side tabs a bottom liner having upwardly bent end portions, and a partitioning insert, the combination of a conveyor for loading and step-advancing carton bodies having a carton body loading station, and adhesive applicator station, a press station, and a carton discharge station, equally spaced from one another a press comprising a reciprocable ram member formed to press an assembled bottom liner and partitioning insert within a carton body located at said press station, said conveyor comprising a pair of bottom guides supporting said bottom flaps in an inwardly folded right angle position and providing anvil surfaces for said ram member at said press station outwardly flanged top guides and cover members supporting therebetween the outwardly folded top side flaps a conveyor belt with carton body engaging members attached thereto having the same spacing as said stations, and means for effecting successive stepped advances to said conveyor belt to move each carton body to the next succeeding station.

References Cited in the file of this patent

UNITED STATES PATENTS

| | | |
|---|---|---|
| 2,637,252 | Swisher | May 5, 1953 |
| 2,937,578 | Dorfman | May 24, 1960 |